United States Patent [19]
Lewis

[11] 4,072,279
[45] Feb. 7, 1978

[54] BELT DRIVE FOR TAPE TRANSPORT, WITH FLOATING ROTOR DRIVE PRESSURE APPLICATION

[75] Inventor: Richard A. Lewis, Sherman Oaks, Calif.

[73] Assignee: Interdyne Company, Van Nuys, Calif.

[21] Appl. No.: 680,195

[22] Filed: Apr. 26, 1976

[51] Int. Cl.² ............... G11B 15/32; G11B 15/66
[52] U.S. Cl. ........................... 242/192; 242/195; 242/197
[58] Field of Search ............... 242/192, 195, 197, 180, 242/181, 201, 202, 196, 67.5, 198

[56] References Cited

U.S. PATENT DOCUMENTS

| | | | |
|---|---|---|---|
| 2,743,878 | 5/1956 | Masterson | 242/192 |
| 2,891,736 | 6/1959 | Blaes | 242/195 |
| 3,604,656 | 9/1971 | Hollingsworth | 242/192 |
| 3,802,644 | 4/1974 | Maiershofer | 242/192 |

FOREIGN PATENT DOCUMENTS

| | | | |
|---|---|---|---|
| 698,262 | 11/1930 | France | 242/192 |
| 751,075 | 12/1952 | Germany | 242/192 |

*Primary Examiner*—George F. Mautz
*Attorney, Agent, or Firm*—William W. Haefliger

[57] ABSTRACT

A tape transport assembly employing a belt drive for the tape comprises:

a. a pair of reels for tape to be transported from a supply roll on one reel to a take-up roll on the other reel, b. an endless belt located to arcuately engage the tape rolls on the respective reels for rotating the rolls and reels to effect said transport in response to endwise travel of the belt, and c. support means for supporting the reels and belt to accommodate bodily displacement of at least one reel relative to the belt into and out of position in which the tape roll on said one reel arcuately deflects and engages a first section of the belt.

16 Claims, 21 Drawing Figures

BELT DRIVE FOR TAPE TRANSPORT, WITH FLOATING ROTOR DRIVE PRESSURE APPLICATION

BACKGROUND OF THE INVENTION

This invention relates generally to tape transports, and more particularly concerns magnetic tape transports of the type in which an endless belt engages and drives tape rolls on rotary tape reels.

Prior belt driven transports are exemplified by the U.S. Pat. Nos. 3,907,230 to Merle; 3,692,255 to Von Behren; 2,743,878 to Masterson; and 3,808,902 to Grant. In certain of these the belt is guided over rollers which are fixed in relation to a frame, and in the Merle patent the belt roller is movable relative to the frame but its movement and location in relation to driven tape rolls is subject to tension in the belt. None of such patents is concerned with a belt drive in which the support of the belt and at least one belt driven tape roll is such as to readily accommodate removal and replacement of that tape roll; and none of such patents is concerned with a drive in which tape rolls are driven by a belt urged by separate rollers toward the tape rolls, a spring means other than the belt being employed to accomplish such urging. Further, effective self-feeding of tape between the tape reels is not suggested by such belt drive transport patents.

Accordingly, the prior art is generally characterized by structural and operational deficiencies, responsible for less than highly satisfactory results.

SUMMARY OF THE INVENTION

It is a major object of the present invention to provide a belt driven tape transport overcoming the above mentioned deficiencies and problems, and to provide an unusually satisfactory transport characterized by certain advantages which are unusual in their combination.

Basically, the transport assembly embodies the following:

a. a pair of reels for tape to be transported from a supply roll on one reel to a take-up roll on the other reel, b. an endless belt located to arcuately engage the tape rolls on the respective reels for rotating the rolls and reels to effect said transport in response to endwise travel of the belt, and c. support means for supporting the reels and belt to accommodate bodily displacement of at least one reel relative to the belt into and out of position in which the tape roll in said one reel arcuately deflects and engages a first section of the belt.

As will be seen, the support means typically includes a frame and belt rollers entraining the belt, the rollers supported on arms to swing in arcs tending to maintain arcuate engagement of the belt with the tape rolls, and spring means being provided to urge the arms to swing in such arcs. Accordingly, primary reliance is not placed on the belt to itself urge the rollers against the tape rolls, and the use of two such rollers and arms accommodate ready replacement of either or both of the tape rolls and associated reels merely by resilient swinging of one or both arms away from the rolls.

It is a further object of the invention to provide a belt driven tape transport in which removability and replaceability of one tape roll and associated reel is especially enhanced and accommodated through peripheral "three-point" support; and centering of that reel and roll relative to a frame is provided by two auxiliary guide rollers, engaging the reel periphery, together with one of the two previously mentioned rollers swingable on an arm to yieldably urge the belt to arcuately engage the tape. Accordingly, the reel and roll may be removed from centered position in a direction generally normal to the reel axis of rotation, against resistance imposed by the one arm supported roller acting through the belt, to be replaced by a substitute reel and tape roll, all in the manner as will appear.

Additional advantages includes the following:

1. A one-piece replaceable tape unit, i.e. one reel and roll, is enabled to be driven by a belt-drive, avoiding need for a replaceable cartridge employing several rotatable parts such as hubs and rollers.

2. The use of a spring means to urge two arm-supported rollers in arcs tending to maintain the belt in arcuate engagement with the tape rolls reduces the belt and roller design requirements, i.e. inexpensive belts with round cross-section may be used, and the requirements for precisely aligned rollers and shafts are substantially reduced.

3. Large speed differentials may easily be generated, leading to improved tape handling reliability because slack (especially during loading) is taken up more rapidly.

4. Fixed reel centers are employed, which provides better resistance to shock and vibration; also the geometry of the belt drive provides for belt length that remains nearly constant for all tape positions on the two reels, whereby the elastic characteristics of the belt are more nearly uniform with temperature, and from beginning to end of tape transport between the two rolls. Also, the normal forces between the arm supported "floating" rollers and the tape packs or rolls may be independent of the belt elastic characteristics and therefore more precisely controlled. The two "floating" roller design further enables optimum belt wrap angles around the tape packs, improving traction so that higher acceleration deceleration rates may be achieved.

5. Simplicity and reliablility of tape self threading, in a belt-drive environment, are achieved.

These and other objects and advantages of the invention, as well as the details of an illustrative embodiment, will be more fully understood from the following description and drawings, in which:

DETAILED DESCRIPTION

Referring to FIGS. 2-6, 11 and 16, the tape storage or supply unit comprises a self-sealing supply reel 10 having an axis 11, spaced flanges 12 and 12' extending in planes normal to the axis, and a hub 13, about which stored magnetic tape 14 is wound in a spiral pack 14a between the flanges. Note that the tape width is less than the width of the space between the flange inner walls 12a, there being slight clearance therebetween.

Figure 6:
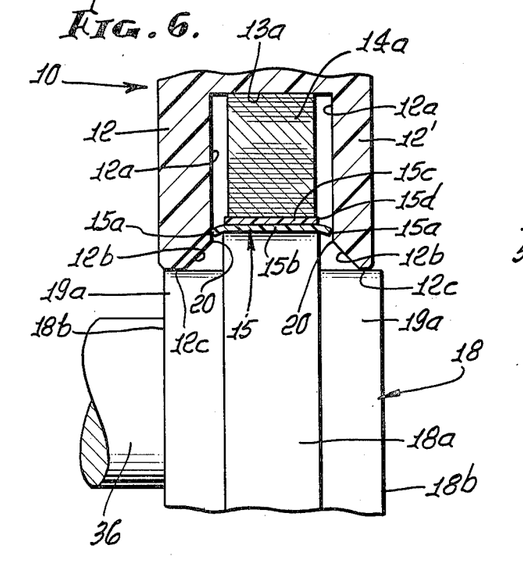
FIG. 6 is an enlarged fragmentary section on lines 6—6 of FIG. 4.
Figure 7:
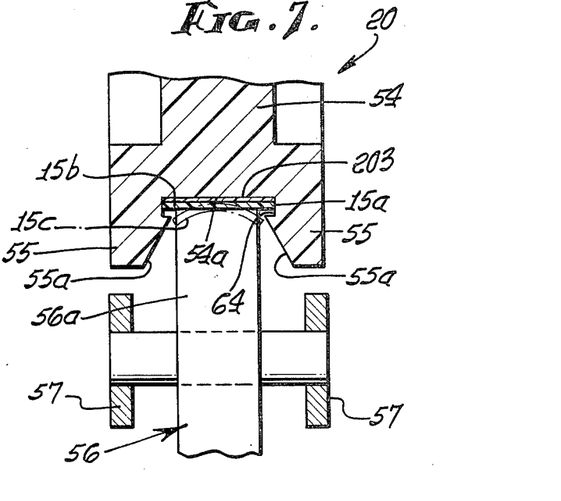
FIG. 7 is an enlarged fragmentary section on lines 7—7 of FIG. 4, showing winding of leader on the take-up reel.

The numeral 15 indicates a thin leader strip connected with the end of the tape, the strip for example consisting of plastic such as MYLAR. While being lengthwise flexible, the leader is resiliently flexible widthwise so as to tend toward a flat planar configuration as indicated in solid lines in FIG. 11c. Further, the width of the leader is typically greater than the tape width, as well as the width of the gap between flange inner faces 12a. In stored condition, as seen in FIG. 6, the opposite edges 15a of the leader are flexed to frictionally grip the inner walls of the flanges as seen in FIG. 6, and extend annularly about the hub in radially outwardly spaced relation thereof; accordingly, when the length of the stored leader is at least about equal to the circumference of the wound tape pack, the tape 14 is protectively confined inwardly of the leader and between the flanges. See also my copending application Ser. No. 628,117, filed Nov. 3, 1975.

FIG. 6 illustrates the manner in which the leader strip may be forcibly displaced into stored position. For this purpose, the flanges 12 and 12' may have annularly opposite faces 12b which taper radially inwardly to guide the leader opposite edges toward the flange inner walls 12a. In addition, a leader engaging rotor 18 has a land portion 18a which projects between the flanges 12 and 12' so as to be in local contact with the leader to bow it widthwise and toward the reel axis for forcibly urging or "snapping" the leader opposite edges 15a against inner walls 12a. FIG. 6 shows this stored and temporary resiliently bowed or locally flexed condition of the leader.

FIG. 6 also illustrates the engagement of the annular peripheries 19a or rotor flanges 18b with the peripheries 12c of the reel flanges 12 and 12'. Such interengagement locates the land portion 18a generally between the flanges 12 and 12' so as to forcibly bow the leader, enabling camming of the leader opposite edges 15a over the edges 20 between surfaces 12b and inner walls 12a. Edges 12b may be rounded, if desired.

Figure 1:
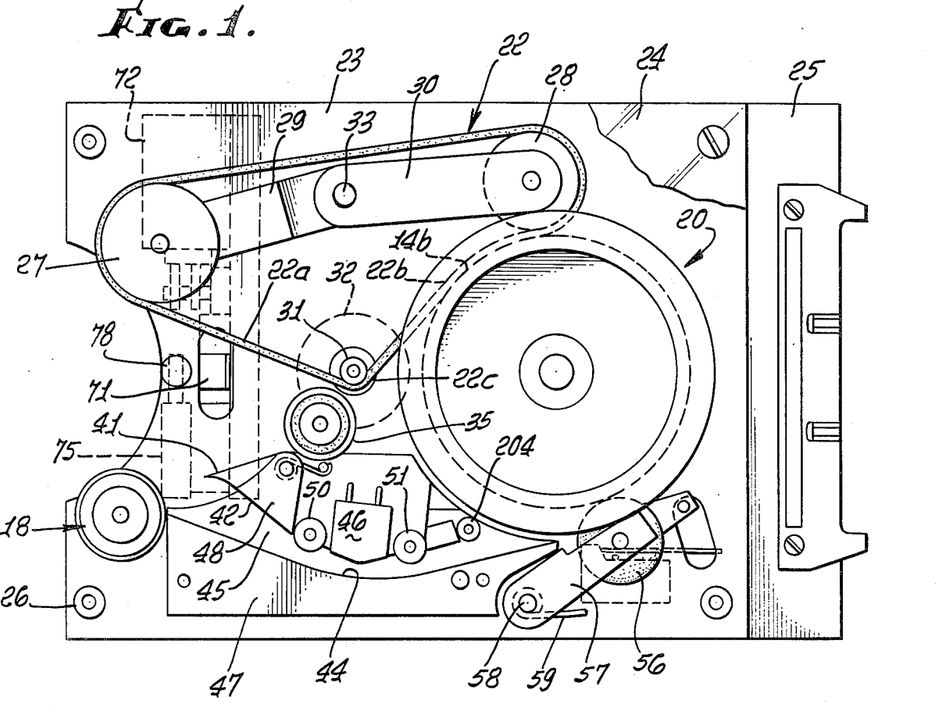
FIG. 1 is a side elevation showing the transport apparatus incorporating the invention, but without insertion of a supply reel.
Figure 2:
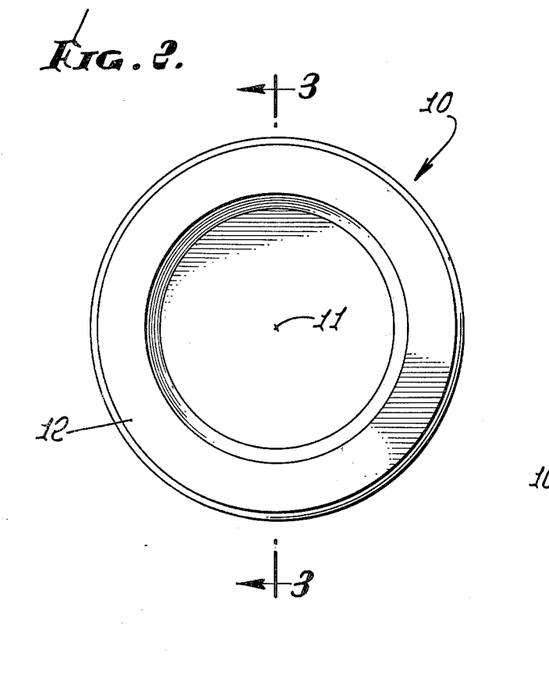
FIG. 2 is a side elevation showing a supply reel.
Figure 3:
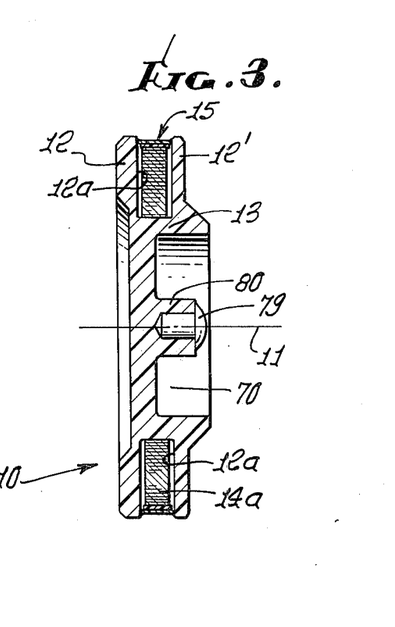
FIG. 3 is a section taken on lines 3—3 of FIG. 2.
Figure 4:
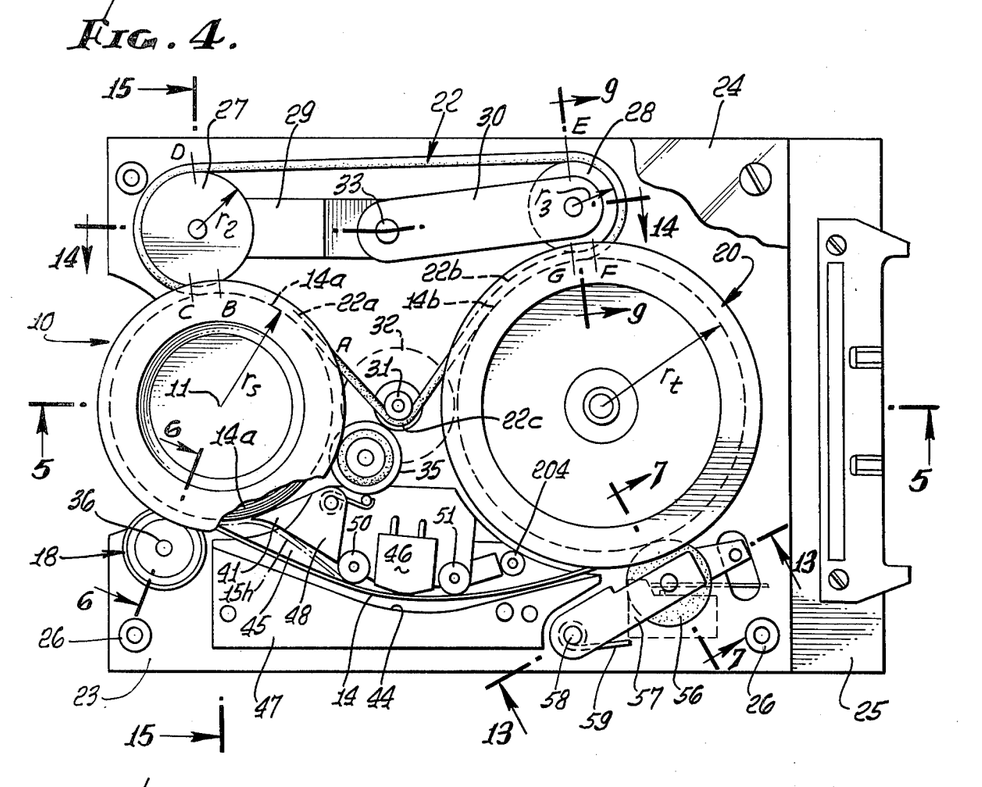
FIG. 4 is a view like FIG. 1 showing the apparatus in operation with the supply reel inserted.

Referring now to FIGS. 1 and 4, the tape transport assembly basically comprises a pair of reels for tape 14 to be transported from a supply roll or pack 14a on one reel such as reel 10 to a take-up roll or pack 14b on the other reel, as for example at 20; also, an endless belt, as at 22, is located to arcuately engage the tape rolls on the respective reels for rotating the tape rolls on the reels to effect tape transport between the rolls in response to endwise travel of the belt. Finally, support means is provided to support the reels and belt to accommodate bodily displacement of at least one of the reels (as for example reel 10) relative to the belt and into and out of transport position (as seen in FIG. 4) in which the tape roll 14a on reel 10 arcuately deflects and engages a first section 22a of the belt. FIG. 1 shows the belt first section 22a in undeflected condition prior to loading of the reel 10 and tape roll 14a into transport position.

Figure 9:
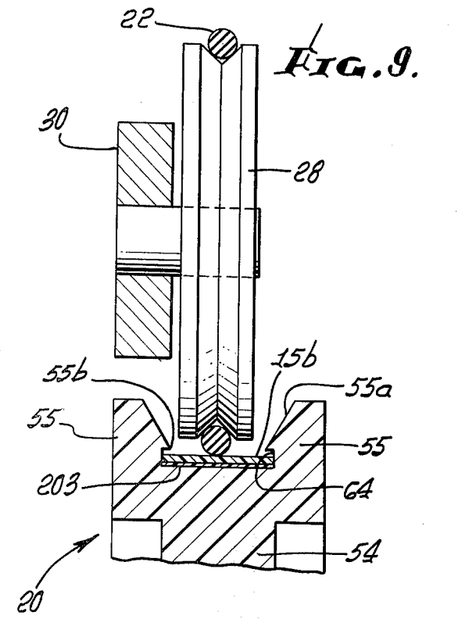
FIG. 9 is an enlarged fragmentary section on lines 9—9 of FIG. 4.
Figure 10:
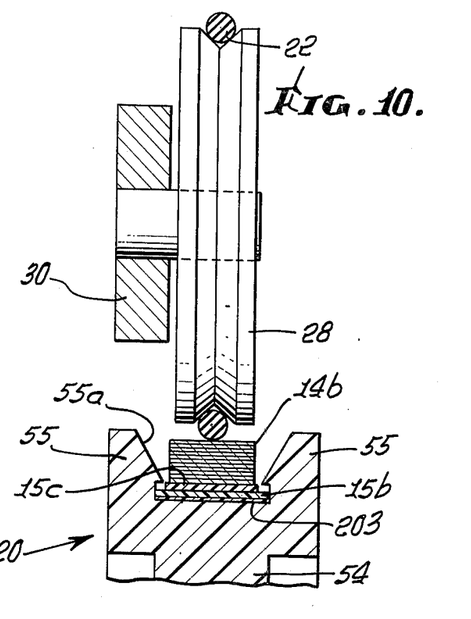
FIG. 10 is a view like FIG. 9, but showing tape wound on the take-up reel.
Figures 14, 15, 16, 17, 18:
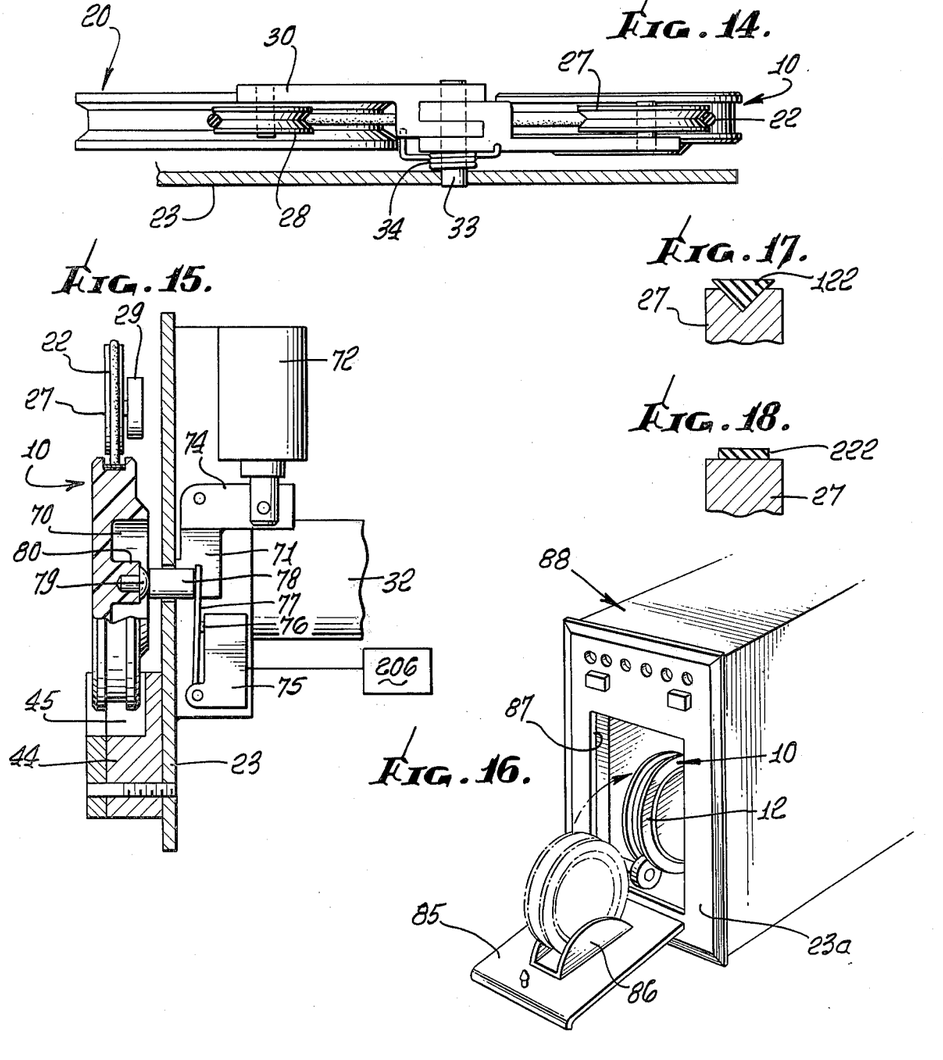
FIG. 14 is a section on lines 14—14 of FIG. 4.
FIG. 15 is a vertical section on lines 15—15 of FIG. 4.
FIG. 16 is a perspective view of apparatus embodying the invention.
FIGS. 17 and 18 are sections showing other belt cross sections.

The support means may advantageously include a frame which may, for example, include a support plate 23 and wall 24 and circuit board 25 interconnected by posts 26; also, the support means may be considered to include belt rollers 27 and 28 entraining the belt, and arms 29 and 30 supporting such rollers to swing in arcs. As illustrated one idler roller 27 is carried by arm 29 to swing bodily clockwise in FIG. 4 and in an arc relative to the frame in response to displacement of tape loaded reel 10 into and out of transport position; further, arm 29 supports belt roller 27 to swing counterclockwise in an arc tending to maintain arcuate engagement of the belt first section 22a with the tape roll 14a on reel 10, during tape transport. Similarly, second arm 30 supports idler roller 28 to swing in a clockwise arc tending to maintain arcuate engagement of a second section 22b of the belt with the tape roll 14b on reel 20. FIGS. 4 and 14 show arms 29 and 30 pivoted at 33 about a common axis, and a torsion spring 34 acting to resiliently urge the arms toward the tape packs. The spring turns are wrapped about pivot post 33 attached to plate 23. FIGS. 9 and 10 show positions of arms 30 and roller 28 during tape build-up on reel 20.

The support means may also include a motor driven pulley 31 entraining the belt at 22c between sections 22a and 22b, there being a drive such as single motor 32 operatively connected with the pulley to rotate same. The belt itself may consist of an elastomeric material, and may advantageously have circular cross-section; thus, the belt may consist of a rubber O-ring, for example. Consequently, rollers 27 and 28 may comprise pulleys.

The support means may include auxiliary rollers carried by the frame to be engaged by reel 10 in response to bodily displacement of reel 10 into loaded or inserted position, seen in FIG. 4. Such auxiliary rollers may include idler roll 18 previously described, and roll 35 having a construction similar to that of roll 18. Accordingly, roll 35 also has flanges corresponding to flanges 18a and 18b, with the same or similar functions. FIG. 6 shows roller 18 rotatably mounted on a shaft 36 carried by plate 23, and roller 35 may be similarly rotatably mounted, in fixed position relative to plate 23.

Figure 5:
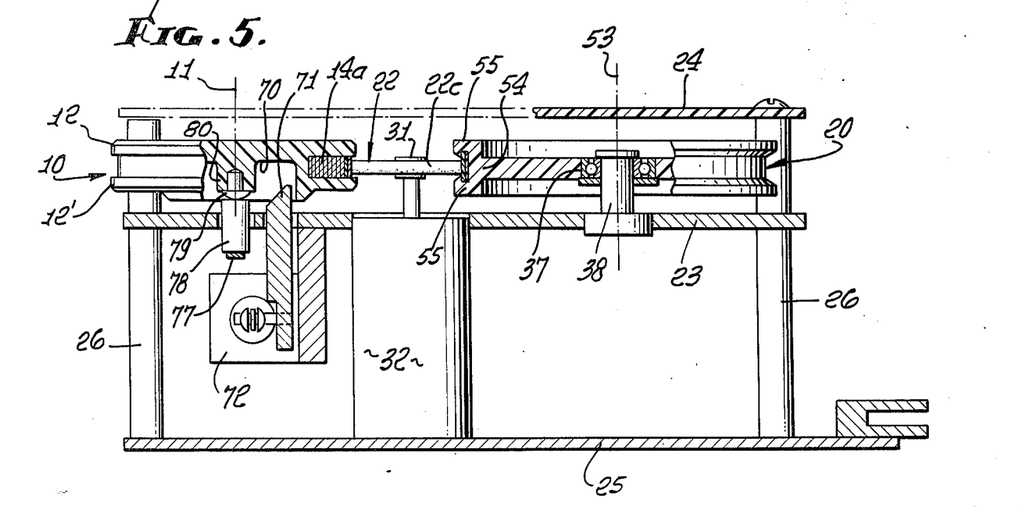
FIG. 5 is a horizontal section on lines 5—5 of FIG. 4.

Reel 20 is suitably mounted in fixed position, as by anti-friction bearings 37 and axle 38 seen in FIG. 5. Axle 38 is carried by plate 23.

Figure 11:
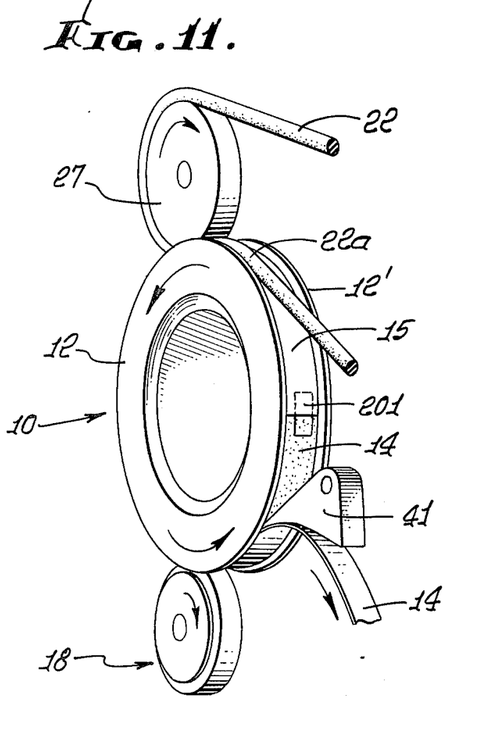
FIG. 11 is a perspective showing of the self-sealing supply reel seen in FIG. 4, the reel rotating in tape unwinding direction.
Figure 11A:
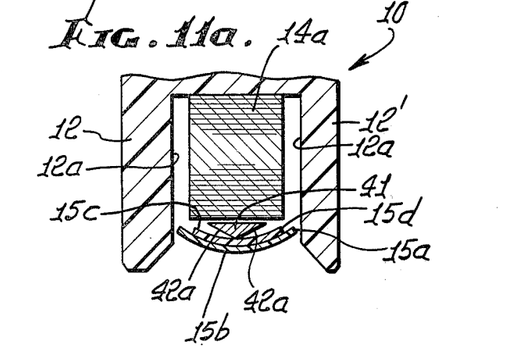
FIG. 11a is a fragmentary section showing stripping of tape off the supply reel.
Figure 11B:
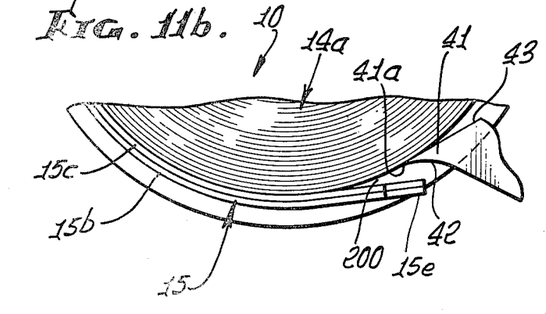
FIG. 11b is fragmentary section in side elevation showing stripping of tape off the supply reel.
Figure 11C:
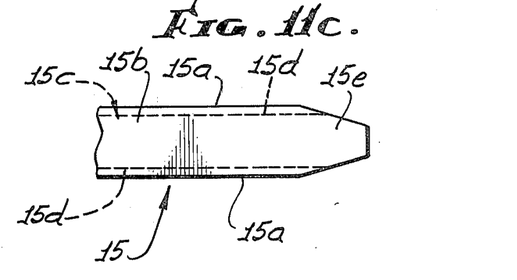
FIG. 11c is a fragmentary showing of a leader tail.

Referring now to FIGS. 1, 4, 11, 11a and 11b, it will be noted that a stripper finger 41 projects between the leader 15 and the tape 14 in the pack on the reel 10, and between flanges 12 and 12', the finger serving to strip the leader free of the walls 12a as the reel rotates in a tape supply direction (see FIG. 11). Finger 41 has opposite faces 42 and 43 tapering toward an apex at 41a, face 43 lying generally parallel to and adjacent the surface of the tape pack. Downwardly lengthwise concave face 42 of the finger deflects the stripped leader and tape toward and into wide guide slot 45 for receiving and guiding the unwinding leader and tape. FIG. 11a shows that the face 42 preferably has sections 42a which taper toward the underside of the leader to bow it outwardly during stripping. FIGS. 11b and 11c show a tab or tail 15e on the end of the leader and which diverges outwardly away the stored leader to provide a gap 200 into which the stripper finger is received to initiate stripping. Slot 45 extends as shown in FIG. 4 toward a read/write head 46, adjacent which the tape is passed.

Figure 12:
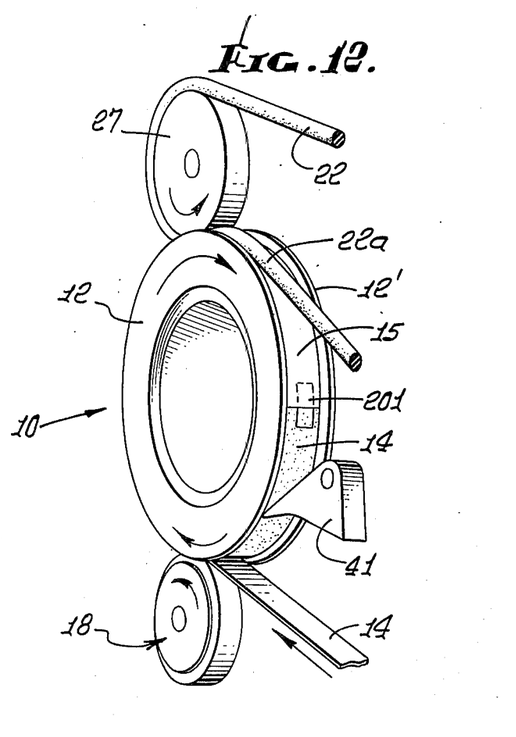
FIG. 12 is a view like FIG. 11, but showing the reel rotating in tape re-winding direction.
Figure 13:
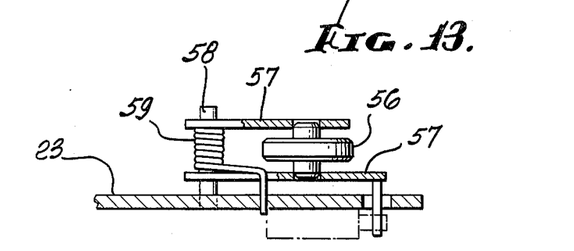
FIG. 13 is a section on lines 13—13 of FIG. 4.

The tape guide means may also be considered to include structure 47 forming upwardly concave guide surface 44, and acting with structure 48 to form the wide slot 45 or chute to guide the leader during threading. Broken line 15h in FIG. 4 indicates the leader path during initial threading. The guide means may also include tape guides such as idler rollers 50 and 51 the peripheries of which are generally tangent with the tensioned tape as it travels lengthwise in the slot 45. FIG. 12 shows the leader 15 being wound on reel 10 as the latter rotates in re-wind mode. Connection of the leader with the tape appears at 201. The length of the leader is typically sufficient to at least once overlap the connection 201.

FIGS. 5 and 7-10 show the construction of the second or take-up reel 20 having an axis 53, hub 54, and spaced flanges 55 projecting normal to axis 53 and radially outwardly of the hub. An idler rotor or roller 56 is located to receive the leader 15 delivered from slot 45 toward the periphery of the hub 54 adjacent the periphery of rotor 56. Rotor 56 is pivotably carried by an arm 57 pivoted to post 58 connected to the frame. Torsion spring 59 urges the arm and rotor 56 toward reel 20, the rotor penetrating between flanges 55 and seen in FIGS. 4, 7 and 8.

Figure 8:
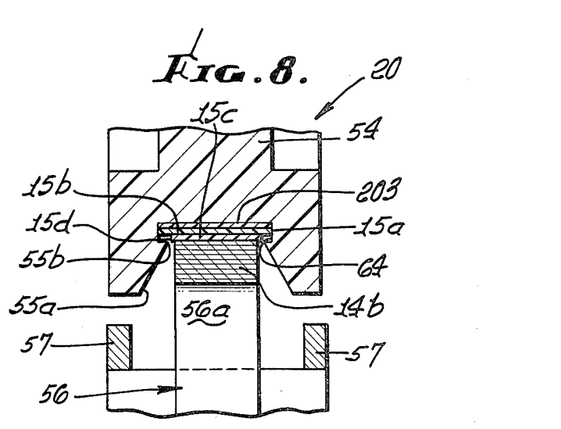
FIG. 8 is a view like FIG. 7 showing the take-up reel after winding of tape on the take-up reel.

As the reel 20 and rotor 56 rotate in take-up mode, the leader entering therebetween is bowed or flexed so that the leader edge portions 15a are forced into grooves 64 sunk in the inner faces of flanges 55 and the leader 15 and tape 14b compressively stored as seen in FIG. 8. Such faces taper at 55a toward the leader annular storage zone between the grooves, and adjacent the outer surface 54a of the hub. The radial thicknesses of the grooves 64 are wide enough to allow one or more thicknesses of the leader to "snap" in place. Formation and storage of the tape in a tight pack 14b outwardly of the leader 15 in FIG. 8 is facilitated by the frictional capture of the leader in grooves 64, as described. A layer 203 of non-slip material such as rubber or soft plastic may be located at the take-up reel hub surface to prevent slippage of the leader captured in the grooves 64. The take-up rotor 56 may include a central land portion having a flat periphery 56a the width of which is slightly less than the gap width between the inner edges 55b of faces 55a.

In re-wind mode with the reels rotating clockwise in FIG. 4, the tape feeds off the pack 14b adjacent the periphery 56a of rotor 56, then travels lengthwise through slot 45; the tape is then guided by slot boundaries and roller guides 50 and 51 into adjacency to the hub surface 13a, of reel 10, and the tape wraps about that hub to form pack 14a seen in FIG. 6. Ultimately, the leader is stripped off reel 20 by roller 204, travels back through slot 45, and is stored in position about the tape pack 14a in the manner described above in connection with FIG. 6.

In operation, tape tension is generated and maintained primarily by a so-called "Pinch Zone Approach Radius Effect." As the belt 22 travels from A to B, in FIG. 4, it is bent so that it has a negative radius $r_s$ (with respect to the center of roller 27) $r_s$ being the belt contact radius of pack, 14a. Since the approach radius of the belt is negative when it enters the pinch zone B–C, the supply tape pack 14a will attempt to rotate slower than the ratio of $r_s$ over $r_2$ would indicate, $r_2$ being the belt contact radius of roller 27. Then as the belt travels from E to F it has a positive radius $r_3$ (with respect to the center of roller 28), and therefore the take-up pack 14b attempts to rotate faster than the ratio of $r_t$ over $r_3$ would indicate, $r_t$ being the belt contact radius of tape pack 14b. This speed differential between the surface velocity of the take up pack and supply pack results in the tape tension across the magnetic head. Since the tape is relatively stiff (compared to the belt), it is not stretched appreciably, therefore the surface velocities of the tape packs are forced to be the same. This, in turn, loads the belt system so that the speed difference is made up through belt stretch, and shear deflection at the contact points. If the normal force is high enough on the idler rollers, no slippage will occur in the pinch zones B–C and F–G. This results in a positive drive coupling which, due to the system symmetry, operates equally well in both tape directions. Tape tension is controlled by selecting the radii for rollers 27 and 28 and by selecting the belt thickness and stiffness.

Referring now to FIGS. 1, 3, 5 and 15, reel 10 defines an annular recess 70 extending about axis 11 and facing laterally parallel to that axis. A latch 71 and solenoid actuator 72 therefor are carried by the frame, i.e. by plate 23, the latch being actuable by the solenoid, as via bell crank 74, so as to advance and project into the recess 70 when the reel 10 is fully received into tape transport position (see FIGS. 4 and 5). Accordingly, the reel cannot be retracted from that position during tape transport. Actuation of the latch solenoid may be accomplished by external electronic logic which prevents removal of the reel while the tape is still threaded in the transport. The switch 75 has a contact operating plunger 76, the latter is displaced by an arm 77 which is in turn displaced clockwise in FIG. 15 by plunger 78. Plunger 78 is displaced by a convex button or head 79 carried by the reel 10 central boss 80. Therefore, when the reel reaches FIG. 14 position, the switch actuates (if button 79 is in place) to permit the "write" electronics 206 to write on the tape. If the button 79 is not in place, the write electronics cannot be energized.

Referring to FIG. 16, a carrier, such as closure 85 and channel member 86 on the closure, is movably carried by the frame to releasably carry the reel 10. Thus, for example, the closure 85 may be pivotally carried at 86 by the frame panel or wall 23a to pivot between lowered retracted position as shown and raised advanced position, closing the opening 87 in transport housing 88. In retracted position as shown, the reel 10 may be placed into or removed from the channel member 86, the webs of which loosely support the reel periphery. In raised advanced position, of the closure 85, the reel is inserted into transport position as seen in FIG. 4, and the latch is operated. When the latch is released, the closure may be opened to retract the reel into access position.

As disclosed in my co-pending U.S. Pat. application Ser. No. 628,117 filed Nov. 3, 1975, the leader strip 15 may consist of two sub-strips 15b and 15c which are interconnected in stacked relation, with edge portions 15a defined by one strip 15b projecting laterally beyond the edges 15d defined by the second sub-strip. The construction is such that the overall leader strip 15 has lengthwise bending stiffness which is substantially greater than leader strip characteristic widthwise bending stiffness; i.e. the two sub-strips may have different bending moduli, and one sub-strip 15b may consist of vinyl while the other sub-strip 15c may consist of MYLAR (with greater bending stiffness). Accordingly, the edge portions 15a of the leader are engageable with the non-grooved inner walls 12a of the flanges 12 and 12' of reel 10 to be frictionally retained in position between those walls, this construction being of unusual advantage in the herein disclosed belt driven transport since the belt cooperates with the leader 15 which may have different radial positions depending upon the tape wrap characteristics, there being no leader trapping grooves in the flange walls. Also, the width tolerances of the reel walls 12a are less critical.

FIGS. 17 and 18 show modified drive belts 122 and 222 respectively having triangular and rectangular cross sections.

I claim:

1. In a tape transport assembly, the combination comprising
   a. a pair of reels for tape to be transported from a supply roll on one reel to a take-up roll on the other reel,
   b. an endless belt located to engage the tape only at the tape rolls on the respective reels for rotating the rolls and reels to effect said transport in response to endwise travel of the belt,
   c. support means for supporting the reels and belt to accommodate bodily displacement of at least one reel relative to the belt into and out of position in which the tape roll on said one reel arcuately deflects and engages a fist section of the belt, the reels supported for free rotation,
   d. said support means including a pulley entraining the belt at a position spaced from the tape, and including a drive operatively connected with said pulley to effect said endwise travel of the belt which constitutes the only drive for the belt, which in turn constitutes the only drive for the tape,
   e. said support means including a frame, and a fixed guide chute on the frame and extending between the reels to guide the tape therebetween, and
   f. said support means also including belt rollers entraining the belt, a first arm supporting one of said rollers to swing in an arc tending to maintain arcuate engagement of a first belt section with the tape roll on one reel, and a second arm supporting another belt roller to swing in an arc tending to maintain arcuate engagement of a second section of the belt with the tape roll on the other reel, said rollers located to squeeze the belt between said one roller and the tape roll on one reel, and between said other roller and the tape roll on the other reel.

2. The combination of claim 1 wherein said support means includes auxiliary rollers carried by the frame to be engaged by said one reel in response to said bodily displacement thereof into said position.

3. The combination of claim 1 including spring means resiliently urging said first arm to swing in said arc.

4. The combination of claim 1 including spring means resiliently urging said first and second arms to swing in said arcs.

5. The combination of claim 1 wherein said belt has circular cross section in undeflected condition.

6. The combination of claim 1 including said tape on the supply reel and a leader strip connected therewith, the leader strip comprising at least two sub-strips which are interconnected in stacked relation, edge portions defined by one sub-strip projecting laterally beyond the edges defined by another sub-strip.

7. The combination of claim 1 including means mounting the other reel in a fixed location relative to said frame.

8. In a tape transport assembly, the combination comprising
   a. a pair of reels for tape to be transported from a supply roll on one reel to a take-up roll on the other reel,
   b. an endless belt located to arcuately engage the tape rolls on the respective reels for rotating the rolls and reels to effect said transport in response to endwise travel of the belt, and
   c. support means for supporting the reels and belt to accommodate bodily displacement of at least one reel relative to the belt into and out of position in which the tape roll on said one reel arcuately deflects and engages a first section of the belt, said support means including a frame, and belt rollers entraining the belt, one of said belt rollers carried for bodily movement relative to the frame in response to said bodily displacement of said one reel into and out of said position, said support means including a first arm supporting said one belt roller to swing in an arc tending to maintain arcuate engagement of said first belt section with the tape roll on said reel in said position during said tape transport, said support means including auxiliary rollers carried by the frame to be engaged by said one reel in response to said bodily displacement thereof into said position,
   d. there being a carrier swingably attached to the frame, and holder structure on the carrier for holding said one reel during swinging of the carrier to insert said one reel into a position of reel engagement by said auxiliary rollers and tape roll engagement with the belt.

9. In a tape transport assembly, the combination comprising
   a. a pair of reels for tape to be transported from a supply roll on one reel to a take-up roll on the other reel,
   b. an endless belt located to arcuately engage the tape rolls on the respective reels for rotating the rolls and reels to effect said transport in response to endwise travel of the belt, and
   c. support means for supporting the reels and belt to accommodate bodily displacement of at least one reel relative to the belt into and out of position in which the tape roll on said one reel arcuately deflects and engages a first section on the belt, said support means including a frame, and belt rollers entraining the belt, one of said belt rollers carried for bodily movement relative to the frame in response to said bodily displacement of said one reel into and out of said position,
   d. said one reel defining an annular recess extending about an axis defined by said one reel and facing laterally parallel to said axis, and including a latch and actuator therefor carried by the frame, the latch being advanced by the actuator to project into said recess when said reel is in said position, and the latch being subject to retraction by the actuator to free the reel for displacement out of said position.

10. The combination of claim 9 including a carrier movably carried by the frame to releasably carry said one reel, the carrier having a retracted position in which the one reel may be placed into the carrier or removed therefrom, and an advanced position in which the one reel is displaced into said position.

11. In a tape transport assembly, the combination comprising
 a. a pair of reels for tape to be transported from a supply roll on one reel to a take-up roll on the other reel,
 b. an endless belt located to arcuately engage the tape rolls on the respective reels for rotating the rolls and reels to effect said transport in response to endwise travel of the belt, and
 c. support means for the reels and belt, said support means including a frame and belt rollers entraining the belt, the reels supported to freely rotate,
 d. said support means including a first arm supporting one belt roller to swing in an arc tending to maintain arcuate engagement of a first section of the belt with the tape roll on one reel during said tape transport,
 e. and said support means including a second arm supporting another belt roller to swing in an arc tending to maintain arcuate engagement of a second section of the belt with the tape roll on the other reel during said tape transport,
 f. the belt contacting the tape only at said rolls,
 g. said belt rollers located to squeeze the belt between said one belt roller and the tape roll on said one reel, and between said other belt roller and the tape roll on said other reel.

12. The combination of claim 11 including spring means resiliently urging said arms to swing in said arcs.

13. The combination of claim 12 wherein said spring means includes a torsion spring urging said arms to swing about a common axis and generally toward the respective reels.

14. The combination of claim 12 wherein said belt has circular cross section in undeflected condition.

15. The combination of claim 12 wherein said belt has rectangular cross section.

16. The combination of claim 12 wherein said belt has triangular cross section.

* * * * *